United States Patent
Kohout et al.

(10) Patent No.: US 10,079,768 B2
(45) Date of Patent: Sep. 18, 2018

(54) FRAMEWORK FOR JOINT LEARNING OF NETWORK TRAFFIC REPRESENTATIONS AND TRAFFIC CLASSIFIERS

(71) Applicant: Cisco Technology, Inc., San Jose, CA (US)

(72) Inventors: Jan Kohout, Roudnice Nad Labem (CZ); Tomas Pevny, Praha-Modrany (CZ)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 15/204,061

(22) Filed: Jul. 7, 2016

(65) Prior Publication Data

US 2018/0013681 A1 Jan. 11, 2018

(51) Int. Cl.
| | |
|---|---|
| G06F 21/00 | (2013.01) |
| H04L 29/06 | (2006.01) |
| H04L 12/851 | (2013.01) |
| H04L 12/721 | (2013.01) |
| H04L 29/08 | (2006.01) |
| G06F 17/30 | (2006.01) |

(52) U.S. Cl.
CPC ...... *H04L 47/2441* (2013.01); *G06F 17/3053* (2013.01); *H04L 45/38* (2013.01); *H04L 63/1425* (2013.01); *H04L 67/02* (2013.01)

(58) Field of Classification Search
CPC . H04L 47/2441; H04L 63/1425; H04L 45/38; H04L 67/02; G06F 17/3053
See application file for complete search history.

(56) References Cited

U.S. PATENT DOCUMENTS

| 8,869,276 B2 | 10/2014 | Crovella et al. |
| 9,021,589 B2 | 4/2015 | Anderson et al. |
| 9,306,966 B2 | 4/2016 | Eskin et al. |
| 2007/0139269 A1* | 6/2007 | Chen ............... G01S 5/0252 342/450 |
| 2008/0260221 A1* | 10/2008 | Unal ............... G06K 9/342 382/128 |

OTHER PUBLICATIONS

Guevara et al. "Support Measure Data Description" HAL archives-ouvertes; IEEE Transactions on Pattern Analysis and Machine Intelligence; Dec. 5, 2014; pp. 1-17.

(Continued)

*Primary Examiner* — Lisa C Lewis
(74) *Attorney, Agent, or Firm* — Parker Ibrahim & Berg LLC; James M. Behmke; Stephen D. LeBarron

(57) ABSTRACT

In one embodiment, a device in a network receives traffic data associated with a particular communication channel between two or more nodes in the network. The device generates a mean map by employing kernel embedding of distributions to the traffic data. The device forms a representation of the communication channel by identifying a set of lattice points that approximate the mean map. The device generates a traffic classifier using the representation of the communication channel. The device uses machine learning to jointly identify the set of lattice points and one or more parameters of the traffic classifier. The device causes the traffic classifier to analyze network traffic sent via the communication channel.

20 Claims, 10 Drawing Sheets

(56) References Cited

OTHER PUBLICATIONS

Schwenker et al. "Three learning phases for radial-basis-function networks" Pergamon; Neural Networks; Dec. 18, 2000; pp. 1-21.
WeiJia Lu "Parameters of Network Traffic Prediction Model Jointly Optimized by Genetic Algorithm" Ournal of Networks, vol. 9, No. 3, Mar. 2014; pp. 1-8.
Muandet et al. "Learning from Distributions via Support Measure Machines" pp. 1-9.
"Kernel method" https://en.wikipedia.org/wiki/Kernel_methods; pp. 1-4.
"Kernel density estimation" https://en.wikipedia.org/wiki/Kernel_density_estimation; pp. 1-8.
Gretton et al. "A Kernel Two-Sample Test" Journal of Machine Learning Research 13 (2012); Submitted Apr. 2008; Revised Nov. 2011; Published Mar. 2012; pp. 1-51.
Broomhead et al. "Radial Basis Functions, Multi-Variable Functional Interpolation and Adaptive Networks" Royal Signals & Radar Establishment; RSRE Memorandum No. 4148; Mar. 28, 1988; pp. 1-39.
Tegeler et al. "BotFinder: Finding Bots in Network Traffic Without Deep Packet Inspection" pp. 1-12.
Gu et al. "BotHunter: Detecting Malware Infection Through IDS-Driven Dialog Correlation" 16th USENIX Security Symposium; http://static.usenix.org/legacy/events/sec07/tech/full_papers/gu/gu_html/; pp. 1-21.

* cited by examiner

US 10,079,768 B2

FRAMEWORK FOR JOINT LEARNING OF NETWORK TRAFFIC REPRESENTATIONS AND TRAFFIC CLASSIFIERS

TECHNICAL FIELD

The present disclosure relates generally to computer networks, and, more particularly, to a framework for the joint learning of network traffic representations and traffic classifiers.

BACKGROUND

Computer networks are carrying an ever increasing number of traffic flows with diverse characteristics. In many cases, these characteristics are benign, such as user-generated, Hypertext Transfer Protocol (HTTP) flows to benign servers. In other cases, traffic flows can also exhibit malicious characteristics, such as flows associated with malware, data exfiltration, denial of service (DoS) attacks, etc.

Capturing traffic characteristics improves the functioning of the network by enabling network devices and network administrators to adjust the operations of the network dynamically. For example, a router or other networking device may leverage information about the application associated with a particular traffic flow, to prioritize communication of the flow (e.g., video conferencing traffic may be much more sensitive to jitter or delays than that of email traffic). In another example, a networking device may use the captured traffic information to detect, and often prevent, network attacks and other anomalies in the network. In both examples, classification is typically performed in real-time or in near real-time, allowing the network to adapt quickly to changes in the traffic flows and the traffic flow characteristics that are present in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
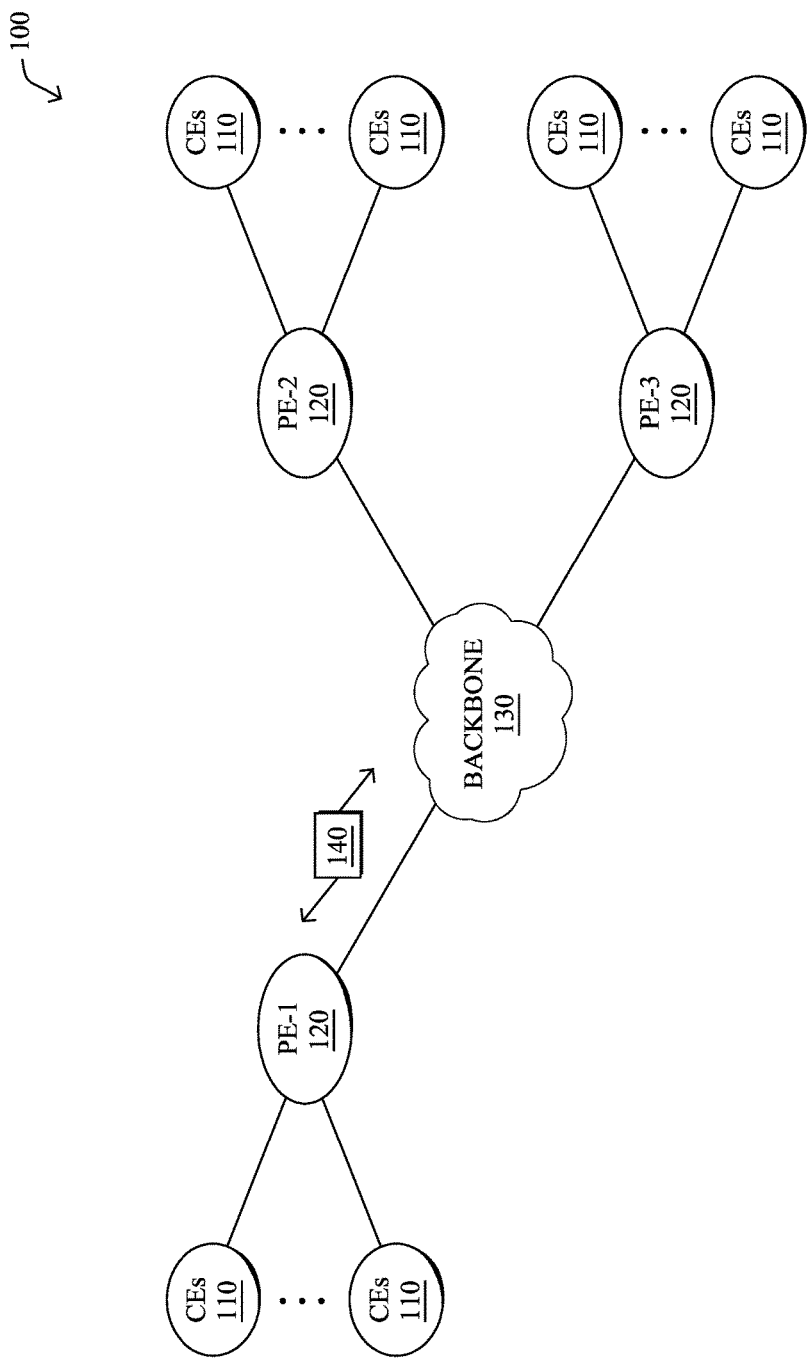
FIGS. 1A-1B illustrate an example communication network.

According to one or more embodiments of the disclosure, a device in a network receives traffic data associated with a particular communication channel between two or more nodes in the network. The device generates a mean map by employing kernel embedding of distributions to the traffic data. The device forms a representation of the communication channel by identifying a set of lattice points that approximate the mean map. The device generates a traffic classifier using the representation of the communication channel. The device uses machine learning to jointly identify the set of lattice points and one or more parameters of the traffic classifier. The device causes the traffic classifier to analyze network traffic sent via the communication channel.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
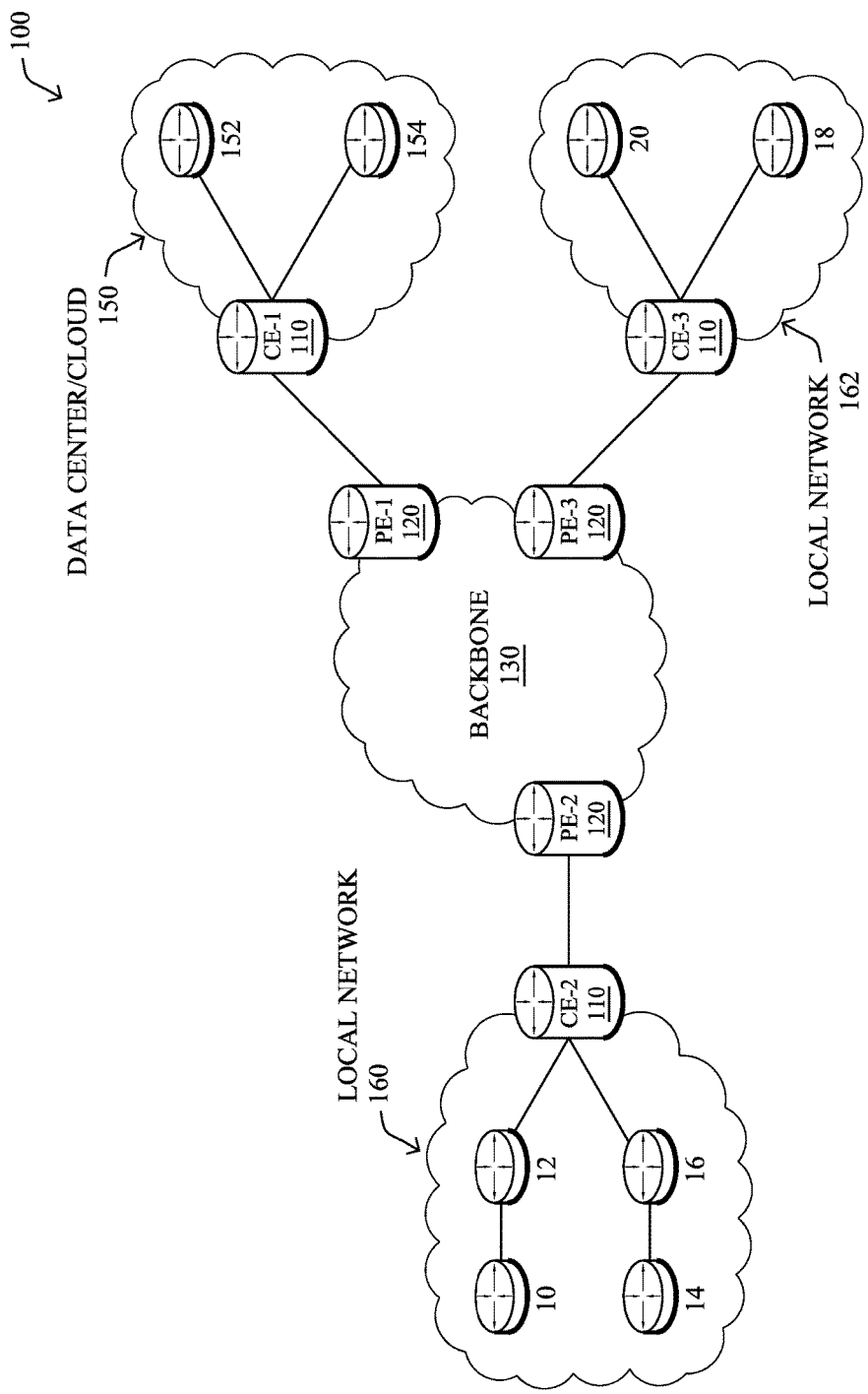

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
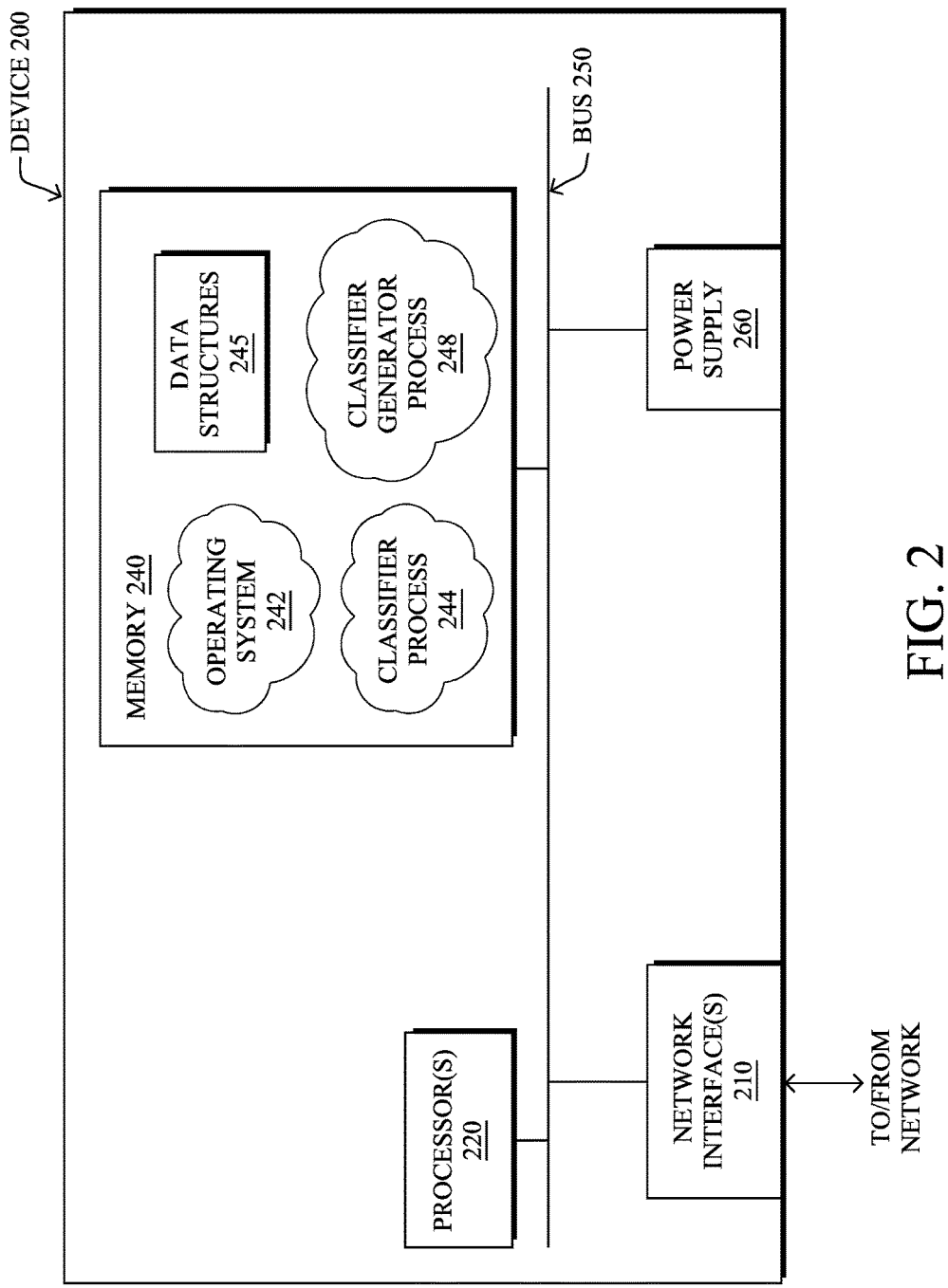
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a classifier process 244 and/or a classifier generator process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, classifier process 244 may execute one or more machine learning-based classifiers to classify traffic data regarding traffic in the network for any number of purposes. In one embodiment, classifier process 244 may assess captured traffic data to determine whether a given traffic flow or set of flows are caused by malware in the network. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a denial of service (DoS) attack, combinations thereof, or the like. In further embodiments, classifier process 244 may classify the gathered traffic data to detect other anomalous behaviors (e.g., malfunctioning devices, misconfigured devices, etc.), traffic pattern changes (e.g., a group of hosts begin sending significantly more or less traffic), or the like.

Classifier process 244 may employ any number of machine learning techniques, to classify the gathered traffic data. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, classifier process 244 can use the model M to classify new data points, such as information regarding new traffic flows in the network. Often, M is a statistical model, and the cost function is inversely proportional to the likelihood of M, given the input data.

In various embodiments, classifier process 244 may employ one or more supervised, unsupervised, or semi-supervised machine learning models. Generally, supervised learning entails the use of a training set of data, as noted above, that is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that classifier process 244 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, classifier process 244 may assess the captured traffic data on a per-flow basis. In other embodiments, classifier process 244 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Classifier generator process 248 may be configured to generate classifier process(es) 244 using, e.g., a training data set regarding traffic flows. In various embodiments, the training data set may comprise captured information regarding the traffic flows. For example, the training data set may include, but is not limited to, information regarding the size of packets in the traffic flows, the durations of the traffic flows, the source and/or destination devices involved in the traffic flows, the applications associated with the traffic flows, application-specific data (e.g., the cryptographic parameters of a transport layer security mechanism, etc.), timestamp information regarding the flows, or any other collected information regarding the traffic flows. In further cases, the training data set may include statistics regarding any of the characteristics of the traffic flows (e.g., averages, maximums, minimums, etc.). For example, the training data set may include the average packet size of each of the traffic flows.

In various embodiments, the training data set that classifier generator process 248 uses to generate classifier process(es) 244 may also include any number of associated classification labels. For example, a simple scheme may label the traffic information in the training data set as either 'malicious' or 'benign.' Another scheme would be to use a set of n-number of labels, where each label indicates the type of malicious behavior observed. In turn, classifier generator process 248 may use this information to train a classifier process 244 to assess whether a malicious traffic flow is present in the network.

Figure 3:
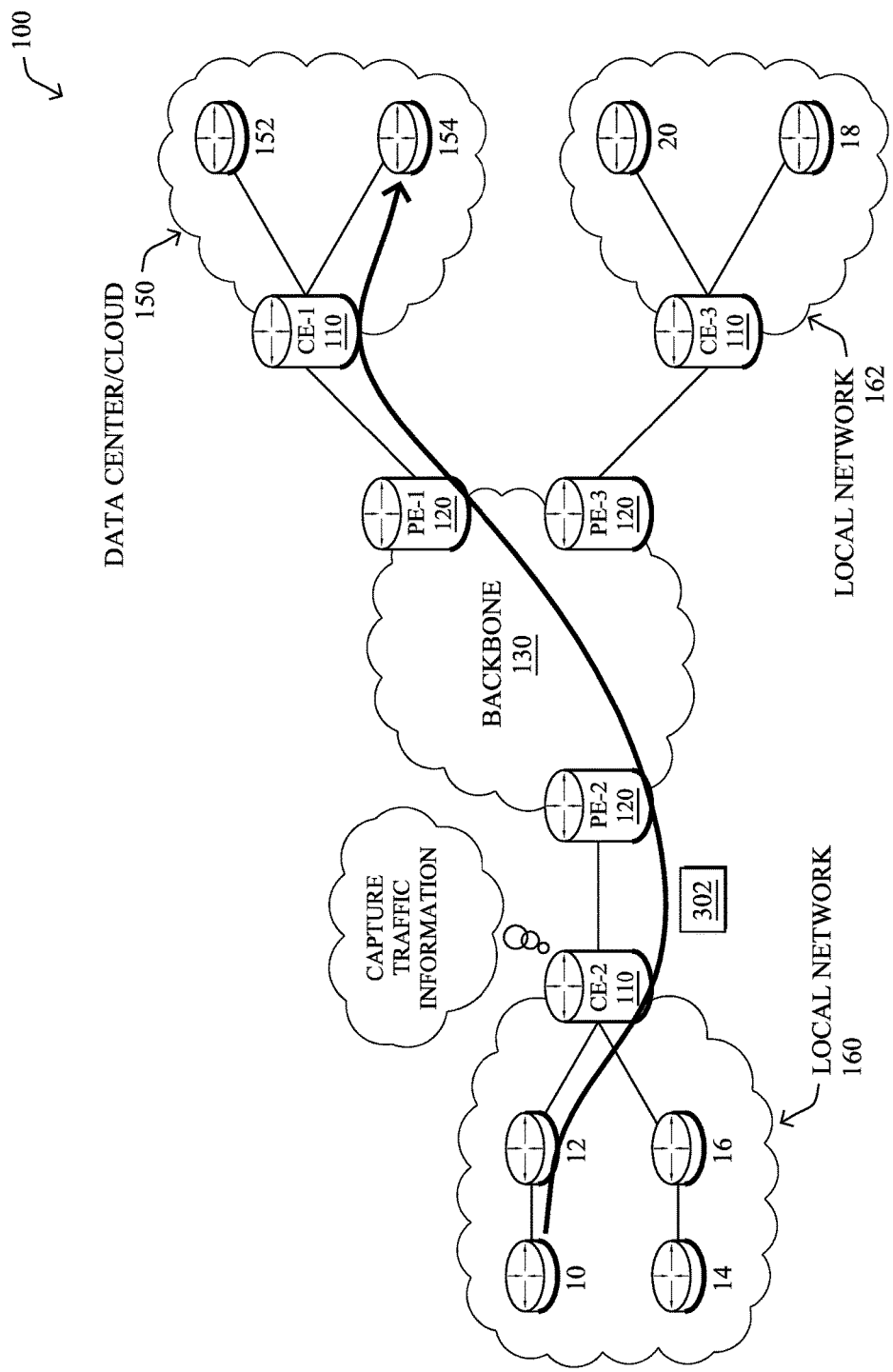
FIG. 3 illustrates an example of a network device capturing traffic data.

As shown in FIG. 3, various mechanisms can be leveraged to capture information about traffic in a network, for purposes of training a classifier and/or using a classifier to classify network traffic. For example, consider the case in which host node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows.

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, traffic classification is an important mechanism to detect potentially malicious traffic flows in a network. However, various challenges exist when classifying network traffic. First, the system must accurately represent the network traffic. Notably, misrepresenting the network traffic may lead to inaccuracies in the training of the classifier and/or in any classification results. Second, the parameters of the classifier itself should be optimized, ensure that the performance of the classification results are acceptable (e.g., by minimizing false positives and false negatives, etc.).

Framework for Joint Learning of Network Traffic Representations and Traffic Classifiers The techniques herein allow for the joint learning of 1.) a representation of network traffic sent via a communication channel, and 2.) a network traffic classifier for is the communication channel. In some aspects, the techniques herein jointly optimize both the traffic representation itself, as well as the corresponding traffic classifier, to improve accuracy of the classification results. The techniques herein are independent of any extracted features from the network traffic (e.g., the traffic characteristics used to classify the traffic), allowing the techniques to be used in a variety of different scenarios. Preliminary testing of the techniques herein shows that the techniques result in a classification mechanism with very high discriminative capabilities and is able to capture the most important characteristics of individual classes from an analysis perspective.

Specifically, according to one or more embodiments of the disclosure as described in detail below, a device in a network receives traffic data associated with a particular communication channel between two or more nodes in the network. The device generates a mean map by employing kernel embedding of distributions to the traffic data. The device forms a representation of the communication channel by identifying a set of lattice points that approximate the mean map. The device generates a traffic classifier using the representation of the communication channel. The device uses machine learning to jointly identify the set of lattice points and one or more parameters of the traffic classifier. The device causes the traffic classifier to analyze network traffic sent via the communication channel.

Illustratively, the techniques described herein may be performed by hardware, software, and/or firmware, such as in accordance with the classifier generator process 248, which may include computer executable instructions executed by the processor 220 to perform functions relating to the techniques described herein.

Operationally, a framework is introduced herein that enables the joint learning of a classifier and representation of communication channels in computer networks, e.g., sessions between a client and a web server. Such a classifier may, for example, be configured to discern between benign and malicious traffic channels in a network.

Figure 4:
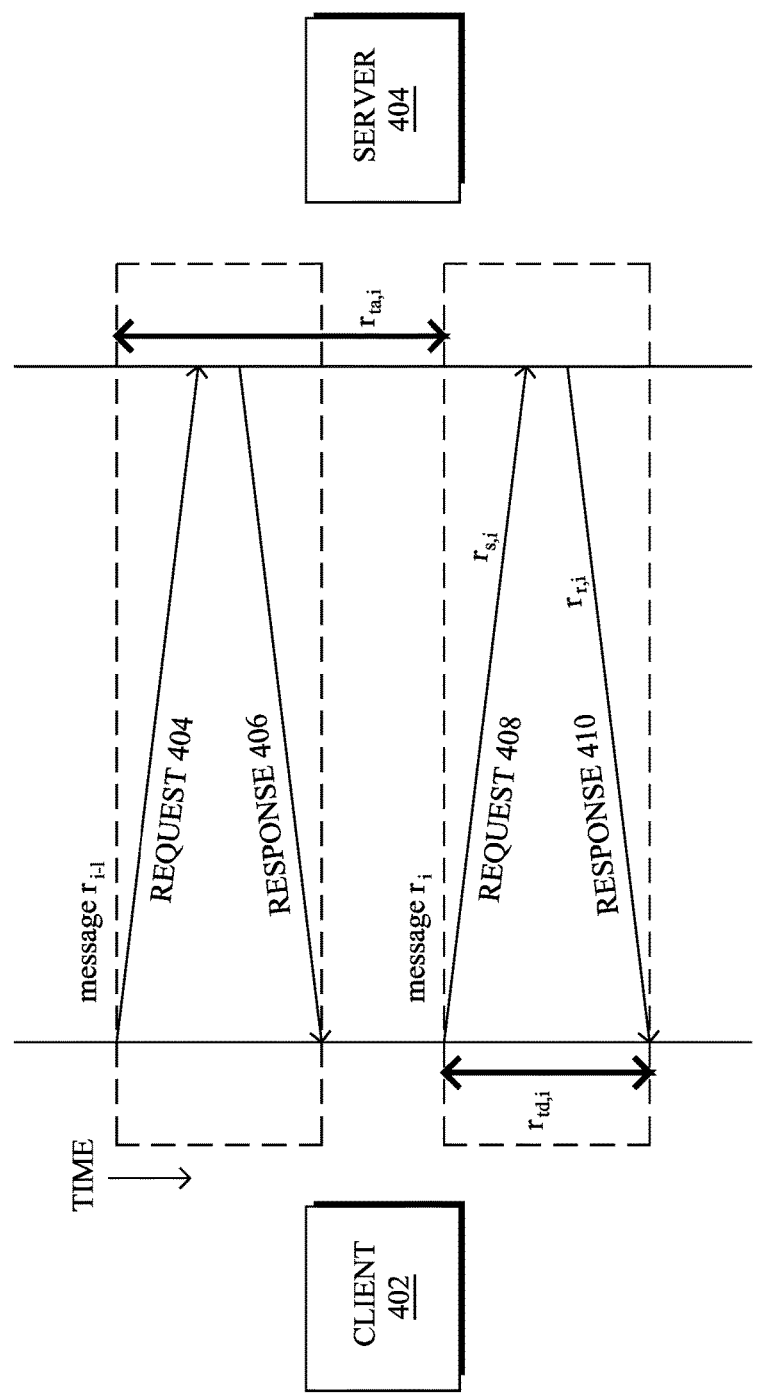
FIG. 4 illustrates an example communication channel.
Figure 5A:
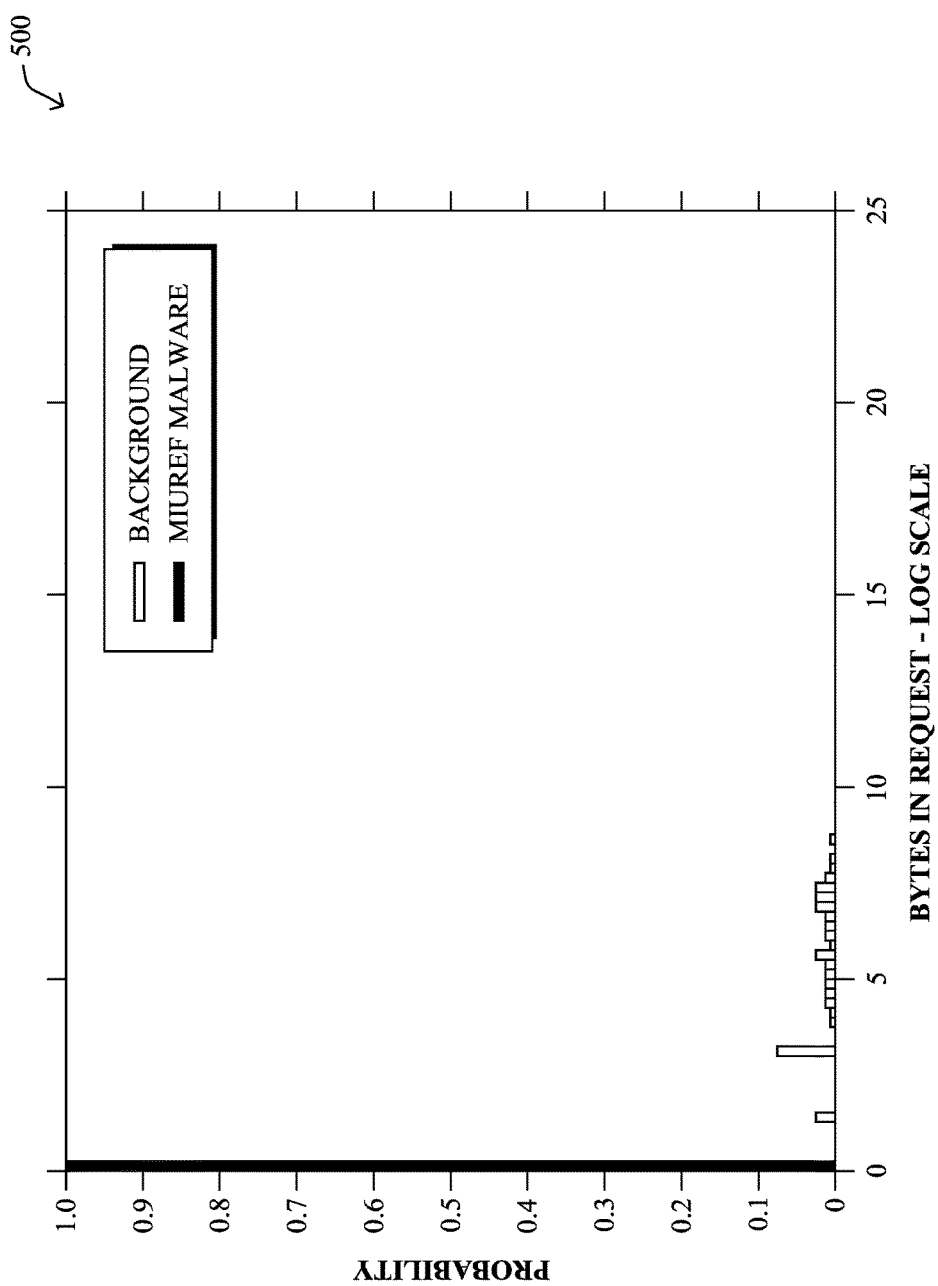
FIGS. 5A-5D illustrate example plots showing characteristics of malicious traffic.
Figure 5B:
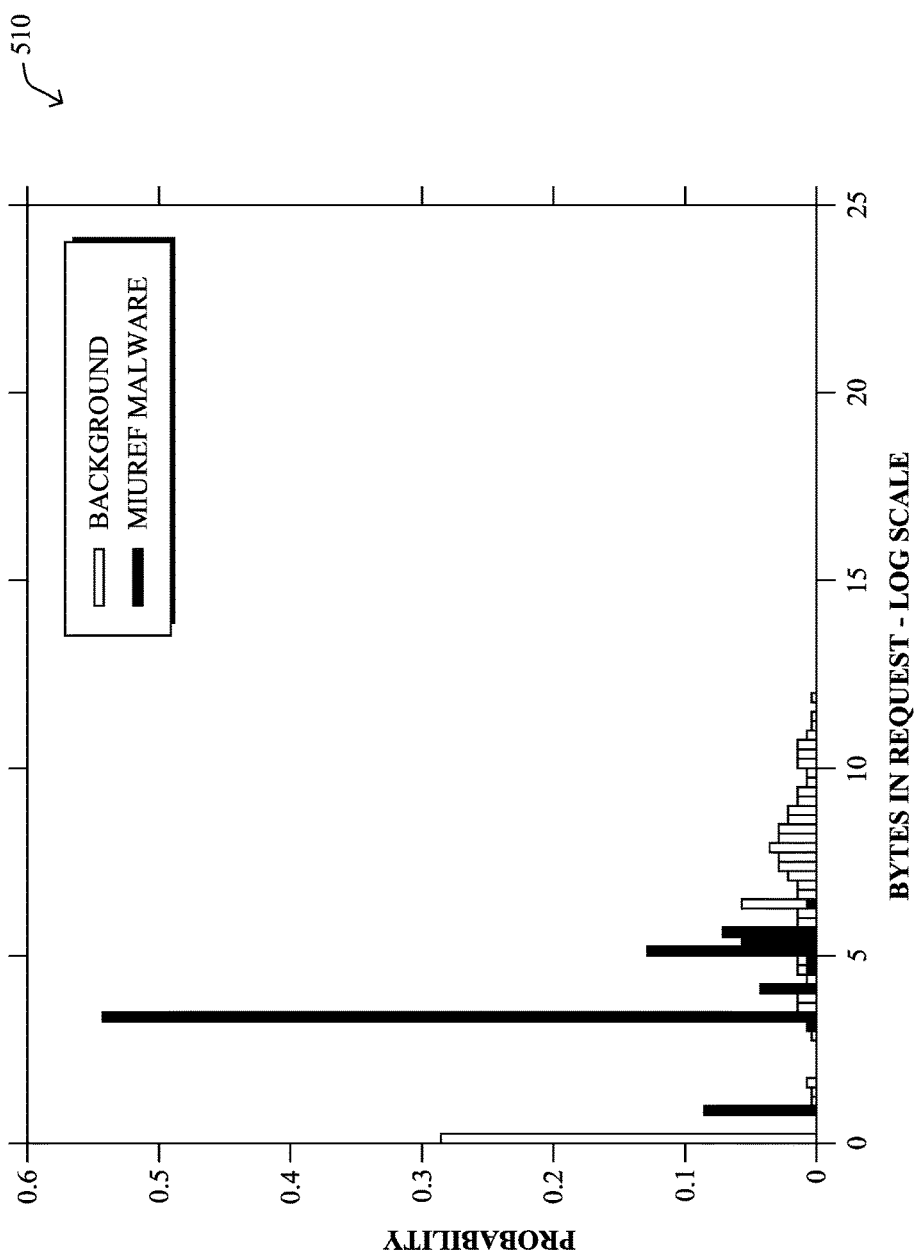
Figure 5C:
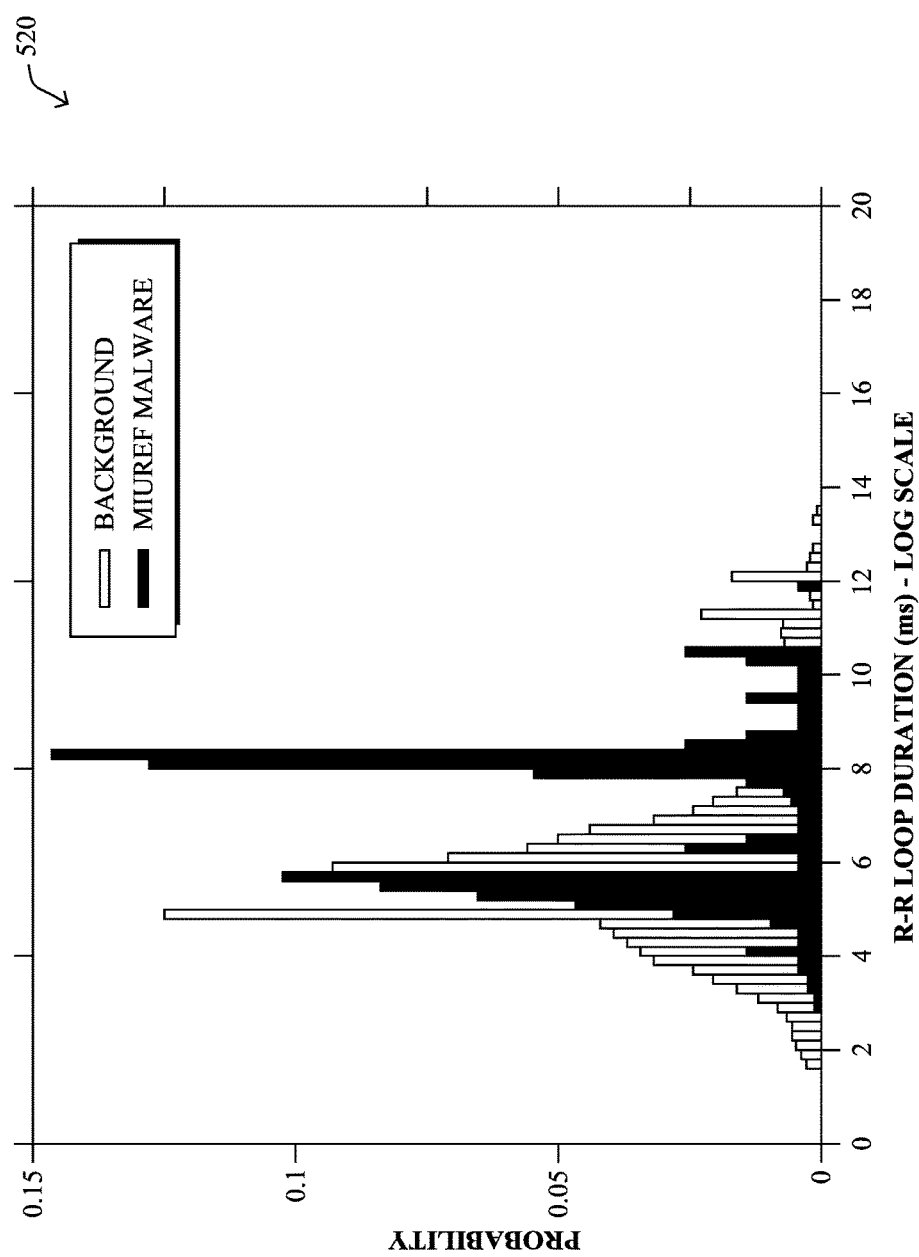
Figure 5D:
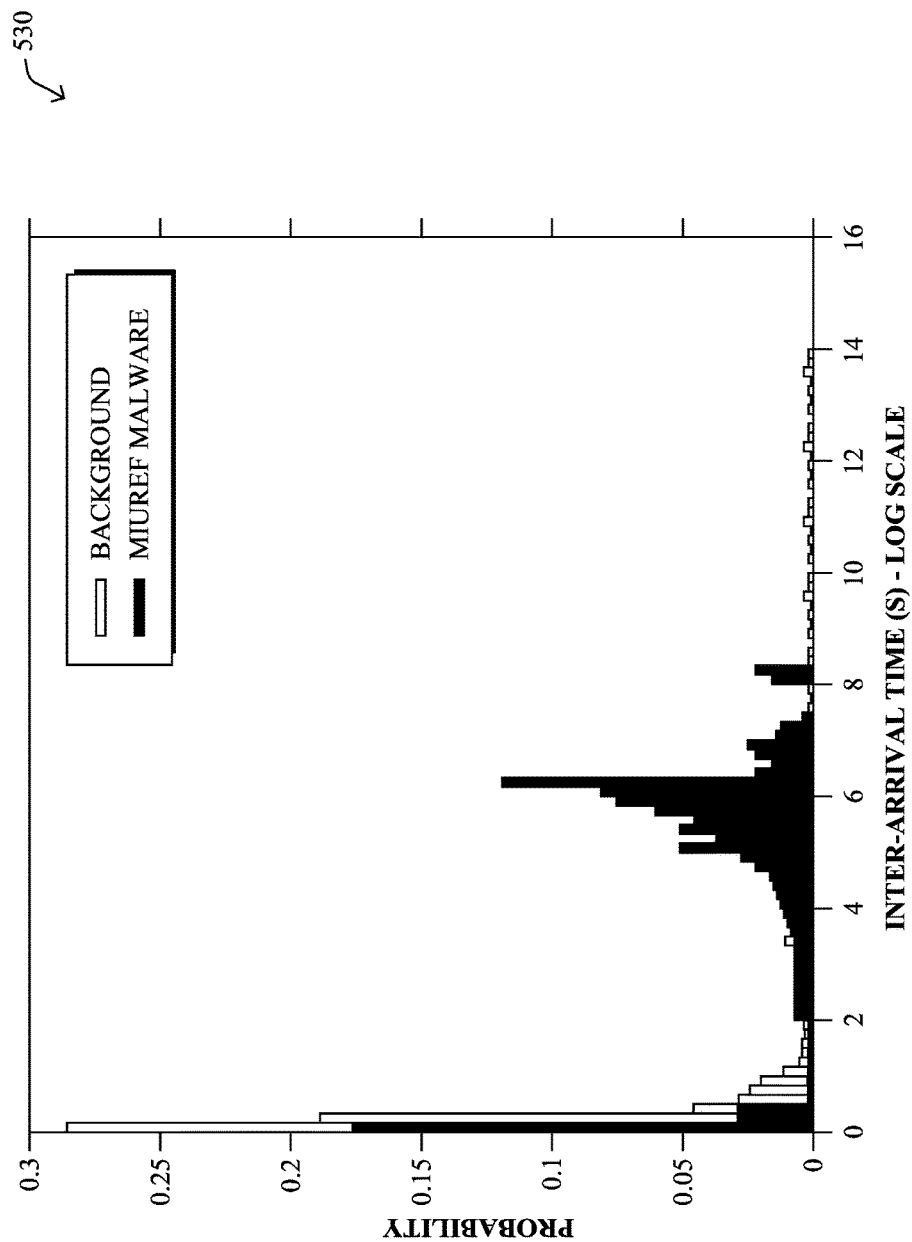

FIG. 4 illustrates an example communication channel, in accordance with various embodiments herein. In general, a communication channel refers to a set of repeated communications between two given network nodes/hosts that have exchanged more than a minimal number of messages. For example, as shown, consider the case of a client device 402 that is in communication with a remote server 404. Client 402 and server 404 may exchange any number of messages that may comprise a request and/or a response. For example, individual messages/traffic exchanged between client 402 and server 404 may include, but are not limited to, HTTP(S) request-response pairs, a single TCP or UDP communication, a NetFlow message, or any other type of network traffic.

An intermediate device located along the path between client 402 and server 404 (e.g., a CE router 110, a cloud service device, etc.) may capture various traffic data regarding the communication channel shown. For example, such an intermediate device may capture traffic data regarding the $i^{th}$ message exchange, $r_i$, between client device 402 and server 404. Message $r_i$ may comprise a request 408 sent from client 402 to server 404 and a response 410 sent from server 404 to client 402. Similarly, the prior message, $r_{i-1}$, may include a request 404 and a response 406.

The intermediate device between client 402 and server 404 may capture any or all of the following traffic data regarding message $r_i$:
 The number of bytes in request 408 ($r_{s,i}$)
 The number of bytes in response 410 ($r_{r,i}$)

The time duration of the request-response (R-R) loop of message $r_i(r_{td,i})$

The inter-arrival time between when client 402 sent request 404 of message and when client 402 sent request 408 of message $r_1$ ($r_{ta,i}$)

As would be appreciated, the intermediate device between client 402 and server 404 may capture other features regarding the communication channel, as well, in further embodiments.

Once the intermediate device has captured the traffic data, it may use the traffic data to generate a traffic classifier or operate in conjunction with another device that does so. For example, the intermediate device may provide the captured traffic data to a centralized device, a dedicated server, etc., to generate a traffic classifier based on the traffic data.

Each message in the communication channel can be represented in the captured traffic data as an n-dimensional numerical feature vector. The size of the feature vector may vary in different implementations, depending on which features/traffic characteristics are captured in the traffic data (e.g., the size of the messages, timing information regarding the messages, etc.). In such a case, representing the communication channel itself may entail representing a set of n-dimensional real feature vectors. In some embodiments, the device processing the traffic data may treat each communication channel as a sample from an unknown probability distribution p. The individual messages in the channel, represented by the n-dimensional vectors, are then realizations of a random variable with the distribution p.

In various embodiments, the system may use mean mapping, also known as kernel embedding of distributions, to represent the probability distribution p based on the finite samples. In general, mean mapping/kernel embedding of distributions refers to a class of statistical analysis techniques that represent a probability distribution as an element of a reproducing kernel Hilbert space (RKHS). Such techniques make use of the concept of a kernel, which is a function that can uniquely represent a given RKHS. As would be appreciated, the term "kernel" is used herein in the statistical sense (e.g., as opposed to operating system kernels). These statistical approaches have given rise to a number of kernel methods in the field of machine learning which include, e.g., SVMs and the like.

By way of example, let M represent the number of observed messages along a communication channel. In such a case, the system may calculate the mean map $C_p$ of the distribution p as follow:

$$C_p = \frac{1}{M} * \sum_{i=1}^{M} k(r_i, \cdot) \quad \text{Equation 1}$$

where $r_i$ is the $i^{th}$ individual message in 1, ..., M and the function k is the Gaussian kernel centered in $r_i$ in which the second variable is free (which is denoted by the dot). Equation 1 thus represents the communication channel defined by the distribution p and for which M messages were observed. Likewise, the system can calculate the Gaussian kernel function k as follows:

$$k(x, y) = \exp\left(\sum_j -b_j(x_j - y_j)\right)^2 \quad \text{Equation 2}$$

where $b_j$ is a parameter called the bandwidth of the Gaussian kernel k for the $j^{th}$ feature. When used in the statistical sense (e.g., as opposed to the networking sense), this bandwidth acts as a smoothing parameter. This means that $C_p$ is a function, not a single point in a Euclidean space. Accordingly, storing $C_p$ in device memory for classification task may prove challenging, particularly when the number of observed channels is high.

A key aspect of the framework introduced herein is that the above empirical estimate of the mean map $C_p$ in Equation 1 is approximated by evaluating the formula only in a selected set of L n-dimensional points. The optimization of this set of L points, which are also referred to herein as "lattice points," is part of the machine learning process. Therefore, the representation of the communication channel based on the approximated mean map may be computed in the following way:

$$C'_p = \frac{1}{M} * \sum_{i=1}^{M} [k(r_i, l_1), \ldots, k(r_i, l_L)] \quad \text{Equation 3}$$

where $l_1, \ldots, l_L$ are the lattice points. Each $[k(r_i, l_1), \ldots, k(r_i, l_L)]$ is the evaluation of the function k(ri, .) in the finite number of lattice points $l_1, \ldots, l_L$. Because it is an L-dimensional real vector, this approximation allows the system to store each approximated mean map $C'_p$ in the form of one L-dimensional sparse vector, which can be done very efficiently. Hence, the learning of the position of the lattice points is the learning of the representation of the channels. The use of a vector with fixed dimension L in the classification is also much simpler than using the original mean map $C_p$.

The second part of the framework introduced herein applies a linear classifier to the approximated mean maps, $C'_p$. In various embodiments, the system trains the classifier jointly with the search for the optimal positions of the lattice points. As the classified objects (the approximated mean maps) are real vectors of fixed dimension, the classifier can be simply represented by its weights W, which is also a real vector or matrix.

Once the classifier is trained, the training device may cause the classifier to assess network traffic along a given communication channel. For example, the device may use the classifier to assess traffic data locally or deploy the classifier to another device in the network that is configured to execute the classifier. In either case, the device executing the classifier (e.g., classifier 244) may compute a classification score for a channel represented by the approximated mean map $C'_p$ as the product $C'_p*W$. If the classification score is above a given threshold, the device may classify the channel is classified as positive (e.g., the traffic along the channel is potentially malicious). In some embodiments, the device may use any number of a variety of machine learning techniques, to determine the appropriate threshold (e.g., operating point) for the classification score.

As noted previously, the system may jointly optimize both the representation of the communication channel, as well as the resulting classifier. According to various embodiments, the system may optimize any or all of the following using learning techniques:

1. C—an L×n matrix which includes coordinates of the lattice points in which the mean maps are evaluated.
2. G—an L×n matrix which contains the bandwidths of the (Gaussian) kernels used in the mean maps. The kernels can be viewed as centered in the lattice points, meaning that there are n-number of different bandwidths (one for each dimension) associated with one n-dimensional lattice point. From the original definition of the mean map above, an assumption is made that all the Gaussian kernels share the same value of bandwidth b for all the features. In further embodiments, separate bandwidths can be used for each lattice point and feature, to enable "specialization" of the lattice points for individual features, as detailed below.

3. W—an L-dimensional vector (or an L×K matrix, if multi-class classification is used to classify the channel into K different classes) which includes parameters of the classifier.

Thanks to the design of this framework, the learning process can be implemented using any stochastic gradient descent method, in various embodiments. The only thing which has to be passed to the learning process is the error function that should be minimized during the learning. For example, the system may use the FP-50 error measure, which is defined as the false positive rate of the classifier when its recall is fixed at 50%. Using this error measure forces the classifier to achieve very low false positive rates, which is highly important security applications, where the classes proportions (malware vs. legitimate) are usually highly imbalanced. Other error measures may be used in other embodiments. Thanks to these very basic features, the framework can be applied to a number of different traffic scenarios, including encrypted traffic (e.g., HTTPS) in which the available information is very limited.

By way of example of operation, a prototype classifier was trained using the framework herein to discern malware belonging to the Miuref family. The prototype used the communication channel definition shown in FIG. 4 and described above, as well as the following features: request bytes, response bytes, request-response loop duration, and inter-arrival times. Testing of the prototype classifier demonstrated that the classifier was able to achieve very high accuracy with the false positive rate below 0.001 at the operating point and recall equal to 0.5, which is the FP-50 error measure used during the learning process. In other words, the probability of a false positive detection is below 0.1% when the probability of detecting a truly malicious channel is 50%. This is indeed a good result, especially given that only very basic features of the communication were used during the test. Note also that the recall was fixed at 50% is just for the purpose of evaluating the FP-50 measure. In practice, the classification threshold can be set according to specific needs of the detection system.

Besides the highly accurate classifier, the testing also demonstrates how the learning process is able to find a representation which captures the most important patterns of the malware's behavior. This is important because, thanks to the joint learning of the representation and the classifier, the learnt representation can be used for extraction of the typical behavior of the given malware/application, which further simplifies and automates its analysis.

The setup of the learning of the Miuref classifier was as follows. First, the total size of the lattice, the parameter L, was set to 50 points. However, since L1 regularization was also applied to the parameters of the classifier during learning to enforce sparsity of the representation, not all of the points were used because the learnt representation was able to capture the malware's behavior with significantly lower number of points. The importance of each lattice point is expressed by the corresponding weight of the classifier because the points for which the classifier's weight is very close to zero do not influence the classification score very much. Therefore, enforcing the sparsity of the classifier's parameters by regularization also enforces the representation to use small number of highly expressive lattice points. Specifically, the learning ended up with only four lattice points with corresponding classifier's weights significantly greater than zero, which are listed in Table 1 below:

TABLE 1

| Point number | Bytes in request | Bytes in response | R-R loop duration | Inter-arrival time |
|---|---|---|---|---|
| 1 | 8.9298 | 4.3756 | 8.0925 | 6.1812 |
| 2 | −0.0002 | 4.8683 | 7.5358 | −1.4645 |
| 3 | −0.2108 | 2.7614 | 9.6015 | −3.4148 |
| 4 | −0.0149 | 3.2346 | 5.5943 | 5.4299 |

The features for which a given point was "specialized" appear in bold in Table 1. As used herein, specialization of a point generally refers to setting the corresponding bandwidth of the Gaussian kernel associated with the given feature to a relatively high value during learning. The result is that the kernel is sensitive only to values that are very close to the position of the "specialized" point. Hence, it can be assume that the "specialized" points represent the malware's behavior, which is indeed important for its detection.

FIGS. 5A-5D illustrate the marginal distributions of the four message features used during testing, providing that the learnt representation of the channels is indeed meaningful. In particular, plots 500-540 illustrate the distribution of the four features for both messages associated with the malware and for messages associated with the remaining network traffic, denoted as "background" traffic in the plots. By looking at the positions of the four "specialized" lattice points and these distributions, we can see that points were placed at areas that are indicative for the Miuref malware. For example, the point number 1 shown in Table 1 above is "specialized" for the feature "R-R loop duration" and is placed very close to the value 8, with respect to this feature. By looking at the distributions of the "R-R loop duration" feature in FIG. 5C, it can be seen that a significant portion of the malware messages has the value of this feature very close to 8, but this is not a common value for the messages of the background traffic. Therefore, centering a highly sensitive (i.e., with high bandwidth) Gaussian kernel at this value is a good indicator of the Miuref malware. The same is true when comparing the other point numbers in Table 1 to the other plots in FIGS. 5A-5D.

Figure 6:
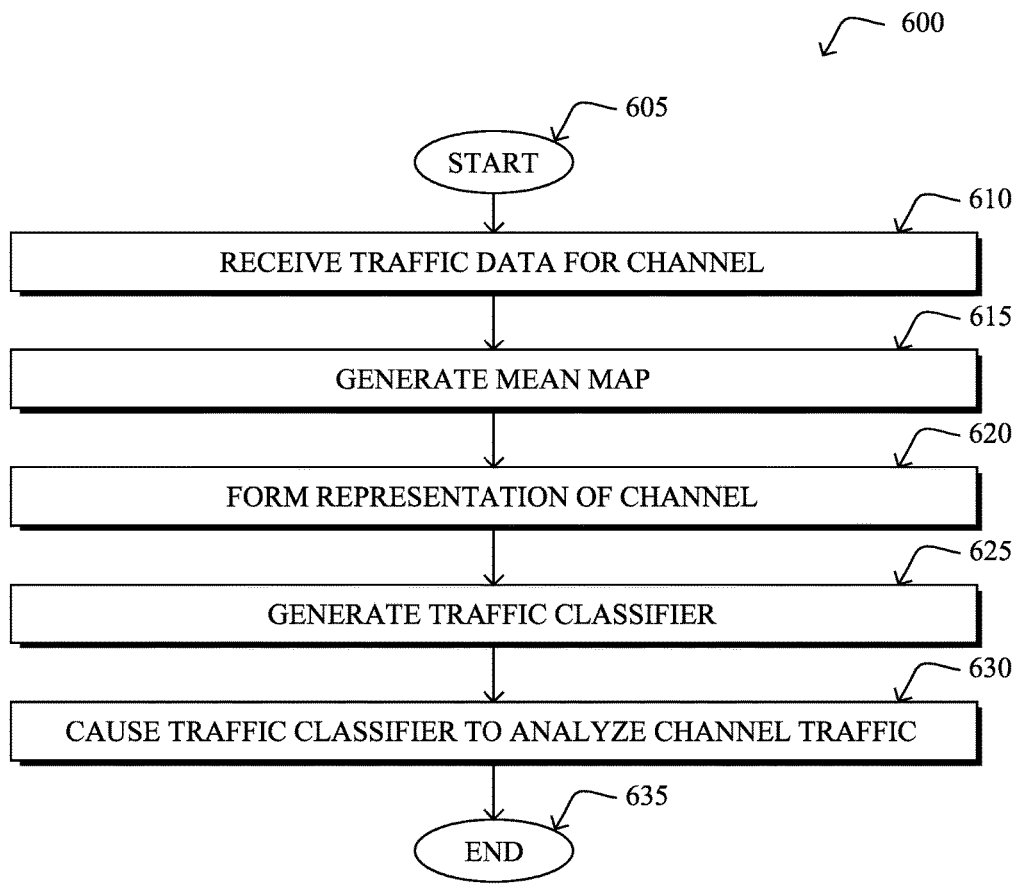
FIG. 6 illustrates an example simplified procedure for training a traffic classifier.

FIG. 6 illustrates an example simplified procedure for training a traffic classifier, in accordance with the embodiments herein. Generally, a non-generic, specialized device in a network may perform procedure 600 by executing stored instructions (e.g., classifier generator process 248). Procedure 600 may start at step 605 and continues on to step 610 where, as described in greater detail above, the device may receive traffic data for a communication channel in the network. Such a channel may refer to a set of messages exchanged between two or more nodes in the network. For example, one communication channel may comprise a set of exchanged HTTP messages between a client and a remote server. The traffic data regarding the channel may include any number of captured characteristics of the messages exchanged via the channel. For example, the traffic data may include, but is not limited to, the packet/byte size of requests or responses, request-response loop times, inter-arrival times between requests, combinations thereof, or the like.

At step 615, as detailed above, the device may generate a mean map from the traffic data. In various embodiments, the device may employ kernel embedding of distributions to the traffic data, to generate the mean map. In many cases, the mean map may be an approximated mean map using, e.g., Equation 3 above. For example, the device may approximate the mean map for the traffic data using a set of lattice points, which may be set of n-dimensional points. In some embodiments, the device may impose a limit on the number of such lattice points.

At step 620, the device may form a representation of the communication channel, as described in greater detail above. In particular, the device may use machine learning to identify an optimal set of lattice points for the approximated mean map of step 615. For example, the device may use a stochastic gradient descent mechanism, to "learn" the set of lattice points for the approximated mean map.

At step 625, as detailed above, the device may generate a traffic classifier for the communication channel. Such a classifier may be based on the representation of the communication channel (e.g., the approximated mean map). For example, the classifier may be a simple linear classifier that is trained to discern whether malware traffic is present in the communication channel. In various embodiments, the device may also employ machine learning (e.g., stochastic gradient descent, etc.), to optimize the parameters of the classifier. The device may do so, in some embodiments, in conjunction with the learning of the lattice points of the approximated mean map that represents the channel.

At step 630, the device may cause the traffic classifier to analyze network traffic sent via the communication channel. In some embodiments, the device itself may execute the traffic classifier, to assess the channel. In other embodiments, the device may provide the classifier to another device that is configured to execute the classifier. For example, the classifier may apply any number of weights to the corresponding lattice points, to compute an overall classification score for the channel/traffic sent via the channel. Notably, if such a score exceeds a defined threshold, the device may classify the channel as having malware-related traffic. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a framework that can use variable features to model network traffic at different layers of the TCP/IP stack. The representation of the traffic (e.g., communication channels) may be optimized jointly with the traffic classifier. Doing so not only improves the accuracy of the classifier, but the resulting representation of the channel is also able to capture the most important traffic patterns, which can further help to identify typical behavior of the target classes. Thanks to the universality of the framework, the framework can be used as a basis for producing "on-demand" classifiers for different malware families or applications.

While there have been shown and described illustrative embodiments that provide for the joint learning of network traffic representations and traffic classifiers, it is to be understood that various other adaptations and modifications may be made within the spirit and scope of the embodiments herein. For example, while certain embodiments are described herein with respect to using certain machine learning techniques, the techniques are not limited as such and may be implemented with other learning techniques, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a network, traffic data associated with a particular communication channel between two or more nodes in the network;
   generating, by the device, a mean map by employing kernel embedding of distributions to the traffic data;
   forming, by the device, a representation of the communication channel by identifying a set of lattice points that approximate the mean map;
   generating, by the device, a traffic classifier using the representation of the communication channel, wherein the device uses machine learning to jointly identify the set of lattice points and one or more parameters of the traffic classifier; and
   causing, by the device, the traffic classifier to analyze network traffic sent via the communication channel.

2. The method as in claim 1, wherein the representation of the communication channel comprises an approximated mean map, and wherein forming the representation of the communication channel comprises:
   calculating an approximation of the mean map as a function of lattice points; and
   identifying the set of lattice points by optimizing the approximation of the mean map.

3. The method as in claim 2, wherein the traffic classifier calculates a classification score for the analyzed network traffic as a product of the approximation of the mean map and a set of weights.

4. The method as in claim 3, further comprising:
   comparing, by the device, the classification score to a classification threshold, to determine whether the analyzed network traffic sent via the communication channel is malicious.

5. The method as in claim 1, further comprising:
   maintaining, by the device, a matrix that comprises a plurality of smoothing parameters associated with kernels of the mean map.

6. The method as in claim 5, further comprising:
   increasing, by the device, at least one of the smoothing parameters in the matrix to increase a sensitivity of the traffic classifier to a particular type of malicious network traffic.

7. The method as in claim 1, further comprising:
   limiting, by the device, a size of the set of lattice points to be below a predefined threshold.

8. The method as in claim 1, wherein causing the traffic classifier to analyze network traffic sent via the communication channel comprises:
providing, by the device, the traffic classifier to a second device in the network that is configured to execute the traffic classifier.

9. The method as in claim 1, wherein the traffic data comprises message data regarding one or more message sent via the communication channel, wherein the message data comprises at least one of: a number of bytes sent in a message request, a number of bytes sent in a message response, a duration of a message, or an inter-arrival time between message requests.

10. An apparatus, comprising:
one or more network interfaces to communicate with a network;
a processor coupled to the network interfaces and configured to execute one or more processes; and
a memory configured to store a process executable by the processor, the process when executed operable to:
receive traffic data associated with a particular communication channel between two or more nodes in the network;
generate a mean map by employing kernel embedding of distributions to the traffic data;
form a representation of the communication channel by identifying a set of lattice points that approximate the mean map;
generate a traffic classifier using the representation of the communication channel, wherein the apparatus uses machine learning to jointly identify the set of lattice points and one or more parameters of the traffic classifier; and
cause the traffic classifier to analyze network traffic sent via the communication channel.

11. The apparatus as in claim 10, wherein the representation of the communication channel comprises an approximated mean map, and wherein the apparatus forms the representation of the communication channel by:
calculating an approximation of the mean map as a function of lattice points; and
identifying the set of lattice points by optimizing the approximation of the mean map.

12. The apparatus as in claim 11, wherein the traffic classifier calculates a classification score for the analyzed network traffic as a product of the approximation of the mean map and a set of weights.

13. The apparatus as in claim 12, wherein the process when executed is further operable to:
compare the classification score to a classification threshold, to determine whether the analyzed network traffic sent via the communication channel is malicious.

14. The apparatus as in claim 10, wherein the process when executed is further operable to:
maintain a matrix that comprises a plurality of smoothing parameters associated with kernels of the mean map.

15. The apparatus as in claim 14, wherein the process when executed is further operable to:
increase at least one of the smoothing parameters in the matrix to increase a sensitivity of the traffic classifier to a particular type of malicious network traffic.

16. The apparatus as in claim 10, wherein the process when executed is further operable to:
limit a size of the set of lattice points to be below a predefined threshold.

17. The apparatus as in claim 10, wherein the apparatus causes the traffic classifier to analyze network traffic sent via the communication channel by providing the traffic classifier to a remote device in the network that is configured to execute the traffic classifier.

18. The apparatus as in claim 10, wherein the traffic data comprises message data regarding one or more message sent via the communication channel, wherein the message data comprises at least one of: a number of bytes sent in a message request, a number of bytes sent in a message response, a duration of a message, or an inter-arrival time between message requests.

19. A tangible, non-transitory, computer-readable medium storing program instructions that cause a device in a network to execute a process comprising:
receiving, at the device, traffic data associated with a particular communication channel between two or more nodes in the network;
generating, by the device, a mean map by employing kernel embedding of distributions to the traffic data;
forming, by the device, a representation of the communication channel by identifying a set of lattice points that approximate the mean map;
generating, by the device, a traffic classifier using the representation of the communication channel, wherein the device uses machine learning to jointly identify the set of lattice points and one or more parameters of the traffic classifier; and
causing, by the device, the traffic classifier to analyze network traffic sent via the communication channel.

20. The tangible, non-transitory, computer-readable medium as in claim 19, wherein the traffic data comprises message data regarding one or more message sent via the communication channel, wherein the message data comprises at least one of: a number of bytes sent in a message request, a number of bytes sent in a message response, a duration of a message, or an inter-arrival time between message requests.

* * * * *

UNITED STATES PATENT AND TRADEMARK OFFICE
CERTIFICATE OF CORRECTION

PATENT NO. : 10,079,768 B2
APPLICATION NO. : 15/204061
DATED : September 18, 2018
INVENTOR(S) : Jan Kohout et al.

It is certified that error appears in the above-identified patent and that said Letters Patent is hereby corrected as shown below:

In the Specification

Column 7, Line 67 delete "is"

Signed and Sealed this
Sixth Day of October, 2020

Andrei Iancu
*Director of the United States Patent and Trademark Office*